US012689138B2

(12) United States Patent
Eheim et al.

(10) Patent No.: US 12,689,138 B2
(45) Date of Patent: Jul. 21, 2026

(54) CONNECTION ASSEMBLY AND METHOD FOR PRODUCING A CONNECTION ASSEMBLY

(71) Applicant: TE Connectivity Germany GmbH, Bensheim (DE)

(72) Inventors: Manuel Eheim, Bensheim (DE); Patrick Distler, Bensheim (DE); Bjoern Hoffmann, Bensheim (DE); Ron Buchholz, Bensheim (DE); Marcus Wolf, Bensheim (DE)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 231 days.

(21) Appl. No.: 18/497,008

(22) Filed: Oct. 30, 2023

(65) Prior Publication Data

US 2024/0145947 A1 May 2, 2024

(30) Foreign Application Priority Data

Nov. 2, 2022 (DE) ........................ 102022128989 .3

(51) Int. Cl.
*H01R 4/62* (2006.01)
*H01R 43/16* (2006.01)

(52) U.S. Cl.
CPC ............... *H01R 4/62* (2013.01); *H01R 43/16* (2013.01)

(58) Field of Classification Search
CPC .................................. H01R 4/62; H01R 43/16
See application file for complete search history.

(56) References Cited

U.S. PATENT DOCUMENTS

2008/0268672 A1* 10/2008 Sargent ..................... H05B 3/84 439/78
2024/0364061 A1* 10/2024 Wang ................... H01R 13/112

FOREIGN PATENT DOCUMENTS

| | | | |
|---|---|---|---|
| CN | 102400991 | A | 4/2012 |
| CN | 104953438 | A | 9/2015 |
| DE | 102013013368 | A1 | 2/2015 |
| DE | 102020120778 | A1 | 2/2022 |
| EP | 3629420 | A1 | 4/2020 |
| EP | 3690260 | A1 | 8/2020 |
| EP | 4125153 | A1 | 1/2023 |
| JP | H0654217 | U | 7/1994 |
| JP | 2011501354 | A | 1/2011 |
| JP | 2012109090 | A | 6/2012 |

(Continued)

OTHER PUBLICATIONS

English Translation of CN 104953438 A (Year: 2015).*

(Continued)

*Primary Examiner* — Sean Gugger
(74) *Attorney, Agent, or Firm* — Jay J. Hoette; Carroll, Hoette & Butscher, LLC

(57) ABSTRACT

A connection assembly includes a busbar made of a first metallic material, where busbar comprises a hole; a contact element which is arranged in the hole in busbar and is made of a second metallic material; where the outer diameter of the part of contact element, which in a direction of insertion is at the rear, is larger than the outer diameter of the part of contact element which in the direction of insertion is at the fore; where the inner surface of the hole in busbar comprises a recess which is filled with the material of contact element, whereby contact element is held in the hole in busbar.

15 Claims, 3 Drawing Sheets

(56) References Cited

FOREIGN PATENT DOCUMENTS

| | | | |
|---|---|---|---|
| JP | 2012221774 | A | 11/2012 |
| JP | 2016225106 | A | 12/2016 |
| JP | 2022097428 | A | 6/2022 |

OTHER PUBLICATIONS

English Translation of DE 102020120778 A1. (Year: 2020).*
Office Action for KR Application No. 2025037725388 dated Apr. 18, 2025 (5 pages).
Office Action for corresponding JP Application No. 2023185216 dated Jan. 7, 2025 (11 pages).
Extended European Search report for corresponding EP Application No. 23206327.1 dated Mar. 20, 2024 (17 pages).
Brodov et al. "Current State and Trends in the Design and Operation of Water-Cooler Condensers of Steam Turbines for Thermal and Nuclear Power Stations (Review)" Thermal Engineering, vol. 66, No. 1; 2019 (11 pages).
Search Report for corresponding DE Application No. 102022128989.3 dated Jun. 14, 2023 (68 pages).
European Aluminium Association: "EAA Aluminium Automotive Manual—Joining", URL: https://cdn.ymaws.com/www.aec.org/resource/resmgr/ PDFs/8-Mechanical-joining_2015.pdf (retrieved on May 18, 2022) (66 pages).
TOX® Pressotechnik GmbH & Co. KG: "TOX®-Clinching Technology", URL: https://de.tox-pressotechnik.com/assets/countries/EN /pdf/TOX_Clinching-Technology_80_en.pdf (retrieved on May 18, 2022) (11 pages).
European Office Action mailed Mar. 24, 2026 for corresponding EP Application No. 23206327.1 (6 pages).

* cited by examiner

CONNECTION ASSEMBLY AND METHOD FOR PRODUCING A CONNECTION ASSEMBLY

CROSS REFERENCE TO RELATED APPLICATIONS

This application claims the benefit of DE Application No. 102022128989.3 filed 2 Nov. 2022, the subject matter of which is herein incorporated by reference in its entirety.

BACKGROUND OF THE INVENTION

The subject matter herein relates to a connection assembly and method for producing a connection assembly.

Connection assemblies are used to electrically connected various components together. For example, a busbar may be connected to a contact element to produce a connection assembly. In some connection assemblies, contact members, such as a contact ring or a contact pin, have different material properties and consist of, for example, a copper part and an aluminum part. Known methods for connecting two or more layers of material utilize local cold forming using a special punch and a die. The punch presses the layers of material into the die cavity where the pressure exerted by the punch forces the metal to flow sideways.

The outcome of the method is a button-shaped extrusion on the die side of the connection assembly which acts as a locking connection and a small cylindrical cavity on the punch side. An undercut (also referred to as a back taper) is created that produces a connection between the first and the second metal material.

However, such methods require a complex setup with a special punch and a die. Therefore, there is a need to create a permanent and electrically conductive connection between copper and aluminum using a simple tool.

BRIEF DESCRIPTION OF THE INVENTION

One or more embodiments of the subject matter herein relates to producing a stable and electrically conductive connection between a cylindrical contact element and a busbar by inserting the cylindrical contact element into a hole in the busbar and using a tool to locally press the wall of the contact element against the wall of the hole in the busbar. In one or more other embodiments, a locking element that remains in the contact can be used to create a material shift in the wall of the hole in the busbar into which material of the cylindrical contact element is pressed so that an undercut (also referred to as a back taper) arises which permanently holds the cylindrical contact element in the hole in the busbar.

In an embodiment, a connection assembly is provided including a busbar made of a first metallic material, where the busbar comprises a hole. The connection assembly includes a contact element which is arranged in the hole in the busbar and is made of a second metallic material. During the production of the connection assembly, the contact element is inserted into the hole in the busbar from one side of the busbar. The outer diameter of the part of the contact element, which in the direction of insertion is at the rear, is larger than the outer diameter of the part of the contact element which in the direction of insertion is at the fore. During assembly, embodiments herein have the advantage that the contact element can move out of the hole in the busbar in a direction opposite to the direction of insertion, but cannot move further thereinto.

In addition, the inner surface of the hole in the busbar comprises a recess which is filled with the material of the contact element, whereby the contact element is held in the hole of the busbar. Embodiments herein provide a permanent and electrically conductive connection between copper and aluminum.

In an example of the connection assembly, the first metallic material comprises aluminum.

In a further example of the connection assembly, the second metallic material comprises copper.

In a further example of the connection assembly, the contact element is tubular.

In a further example of the connection assembly, the contact element comprises a ring pin.

In a further example of the connection assembly, the parts of the connection assembly are silver-plated at least in part. This has the advantage that good electrical conductivity between parts of the connection assembly is ensured.

In an embodiment, a method for producing a connection assembly is provided including the step of: producing a hole in the busbar, for example, by punching or by drilling. This has the advantage of the hole having a simple configuration. The method includes the step of producing a contact element that can be inserted into the hole in the busbar, where the outer diameter of the part of the contact element, which in a direction of insertion is at the rear, is larger than the outer diameter of the part of the contact element which in the direction of insertion is at the fore. The method includes the step of inserting the contact element into the busbar. The method includes the step of inserting into the contact element a removable tool comprising a projection on its outer surface, where the projection presses the wall of the contact element against the inner surface of the hole in the bus bar so that the wall of the contact element is deformed in a radial direction towards the inner surface of the hole in the bus bar, whereby a recess is formed in the inner surface of the hole in the busbar and is filled with the material of the contact element which is pressed against the inner surface of the hole in the busbar. This results in automatic undercutting. As an alternative to the removable tool, a locking element that remains in the component, such as a bushing, can be used.

The wall of the cylindrical contact element and the wall of the hole in the busbar need not necessarily comprise a projection at the beginning of the producing process. Rather, a projection is created in the wall of the contact element during the producing process due to the pressure in the radial direction and in turn exerts pressure in the radial direction onto the wall of the hole in the busbar and leads to a corresponding recess in the wall of the hole in the busbar. Since the recess in the wall of the hole in the busbar is created by the material of the contact element expanding in the radial direction, the former is filled directly by the expanding material of the contact element. This creates a projection in the wall of the contact element that protrudes in the radial direction and engages in the wall of the hole in the busbar. Since the radial direction is substantially orthogonal to the direction of insertion of the contact element into the hole in the busbar, the projection in the wall of the contact element forms an undercut which holds the contact element in the hole in the busbar.

An advantage of the method is therefore the automatic undercutting which enables a permanent and electrically conductive connection between copper and aluminum in a simple and inexpensive method.

In one example of the method, the hole in the busbar is produced by punching. This has the advantage that producing the hole is particularly simple and inexpensive.

In a further example of the method, the hole in the busbar is produced by drilling. This has the advantage that producing the hole is particularly simple and inexpensive.

In a further example of the method, the hole in the busbar is cylindrical. This has the advantage that the simple geometry of the hole in the busbar makes producing the hole particularly simple and inexpensive.

In a further example of the method, the cylindrical hole in the busbar is in particular straight. This has the advantage that the simple geometry of the hole in the busbar makes producing the hole particularly simple and inexpensive.

In a further example of the method, the contact element is tubular. This has the advantage that the contact element can be easily inserted into the hole in the busbar.

In a further example of the method, the contact element is produced by cold forming. Cold forming describes the plastic forming of metals below the recrystallization temperature. In the case of aluminum and copper, cold forming, unlike hot forming, does not require heating the material to the recrystallization temperature. This has the advantage that producing the contact element is particularly simple and inexpensive.

The subject matter shall be explained in more detail with reference to the embodiments shown in the following figures. Same parts are provided with the same reference numbers and/or the same component names. Furthermore, some features or combinations of features from the different embodiments shown and described can in themselves represent solutions that are independent.

DETAILED DESCRIPTION OF THE INVENTION

Figure 1:
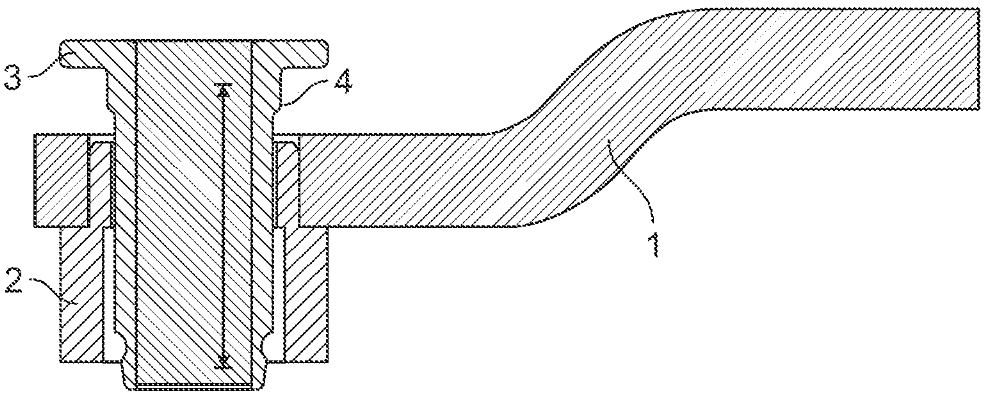
FIG. 1 shows a schematic sectional view of a connection assembly according to a first exemplary embodiment in accordance with embodiments herein.

FIG. 1 shows a schematic sectional view of a connection assembly 7 according to an exemplary embodiment. The connection assembly comprises a busbar 1 made of a first metallic material, for example, aluminum. Busbar 1 comprises a hole in which contact element 2 is arranged. Contact element 2 is made of a second metallic material, for example, copper, and has a tubular shape. In FIG. 1, contact element 2 is inserted into the bore from below. The outer diameter of the part of contact element 2, which in the direction of insertion is at the rear, is larger than the outer diameter of the part of contact element 2 which in the direction of insertion is at the fore, so that contact element 2 inserted into the hole in busbar 1 can move out of the hole in busbar 1, but not further thereinto.

A tool 3 is inserted into tubular contact element 2 in the direction opposite to the direction of insertion of the contact element. Tool 3 comprises a projection 4 on its outer surface. This could be, for example, a type of knurled structure or a difference in diameter. When tool 3 is inserted into tubular contact element 2, projection 4 presses the wall of contact element 2 against inner surface 8 of the hole in busbar 1. The pressure causes the wall of contact element 2 to be deformed in the radial direction towards the inner surface of the hole in busbar 1. As a result, a recess 5 is formed in the inner surface of the hole in busbar 1. This recess 5 is filled with the material of contact element 2 which is pressed against the inner surface of the hole in busbar 1. As an alternative to removable tool 3, a locking element that remains in the component, such as a bushing, can be used.

Figure 2:
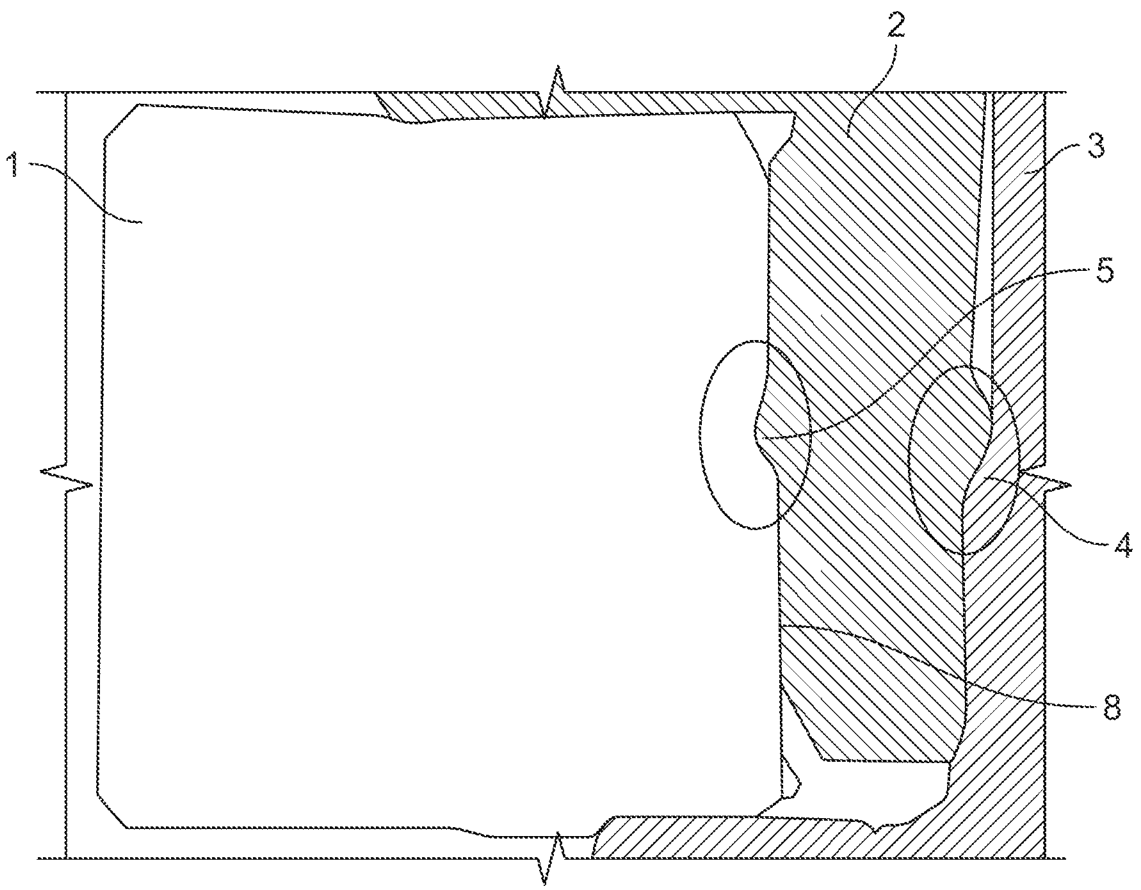
FIG. 2 shows a cross section through the connection assembly from FIG. 1 in accordance with embodiments herein.

FIG. 2 shows a cross section through connection assembly 7, consisting of busbar 1, contact element 2, and tool 3 with projection 4. In FIG. 2, tool 3 is inserted entirely into tubular contact element 2 and a recess 5 is formed in inner surface 8 of the hole in busbar 1 and filled with the material of contact element 2. Recess 5 filled with the material of contact element 2 forms an undercut (also referred to as a back taper) which creates a permanent and electrically conductive connection between the first and the second metal material.

Figure 3:
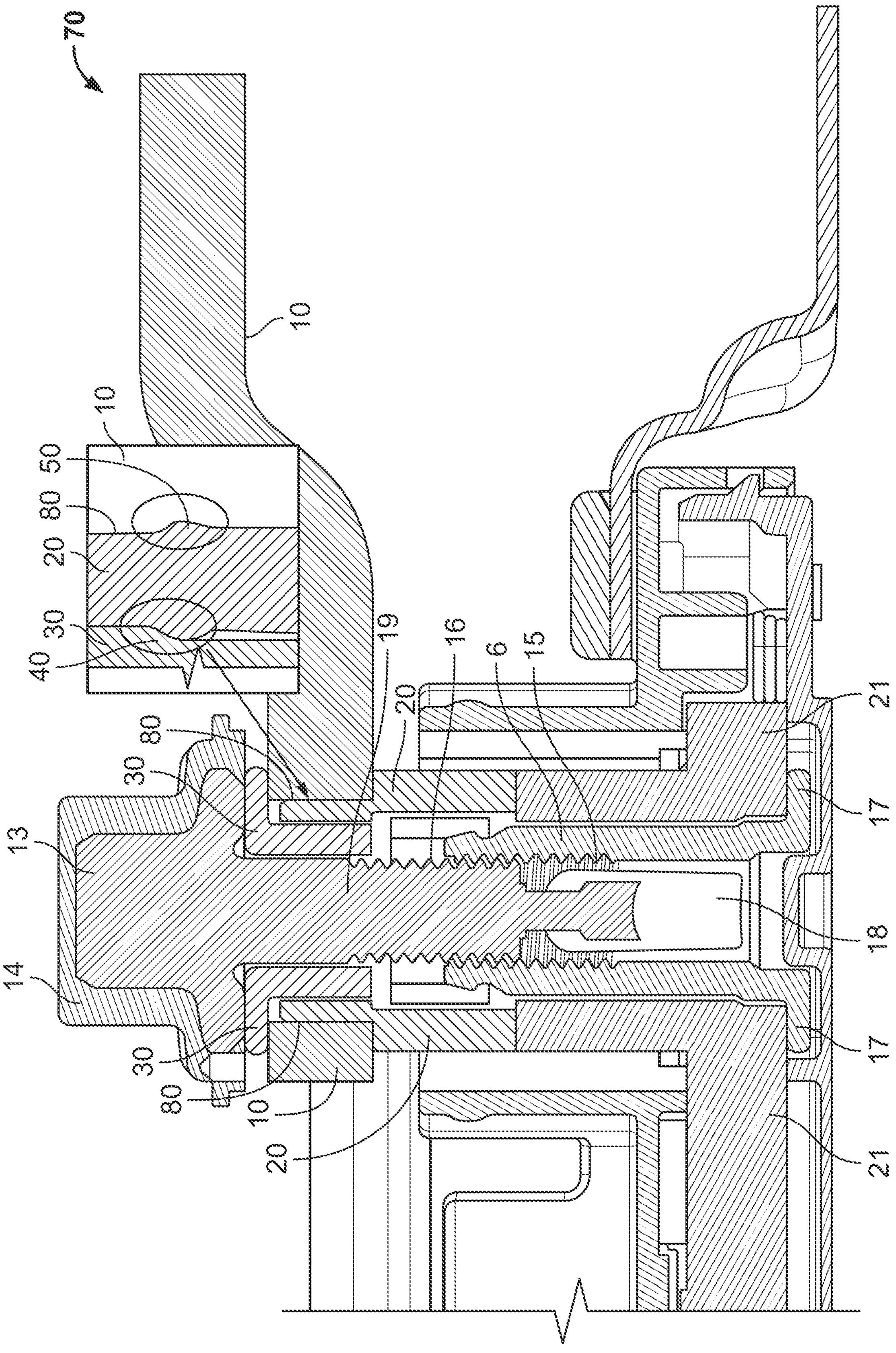
FIG. 3 shows a schematic sectional view of a connection assembly according to a further embodiment in accordance with embodiments herein.
Figure 4:
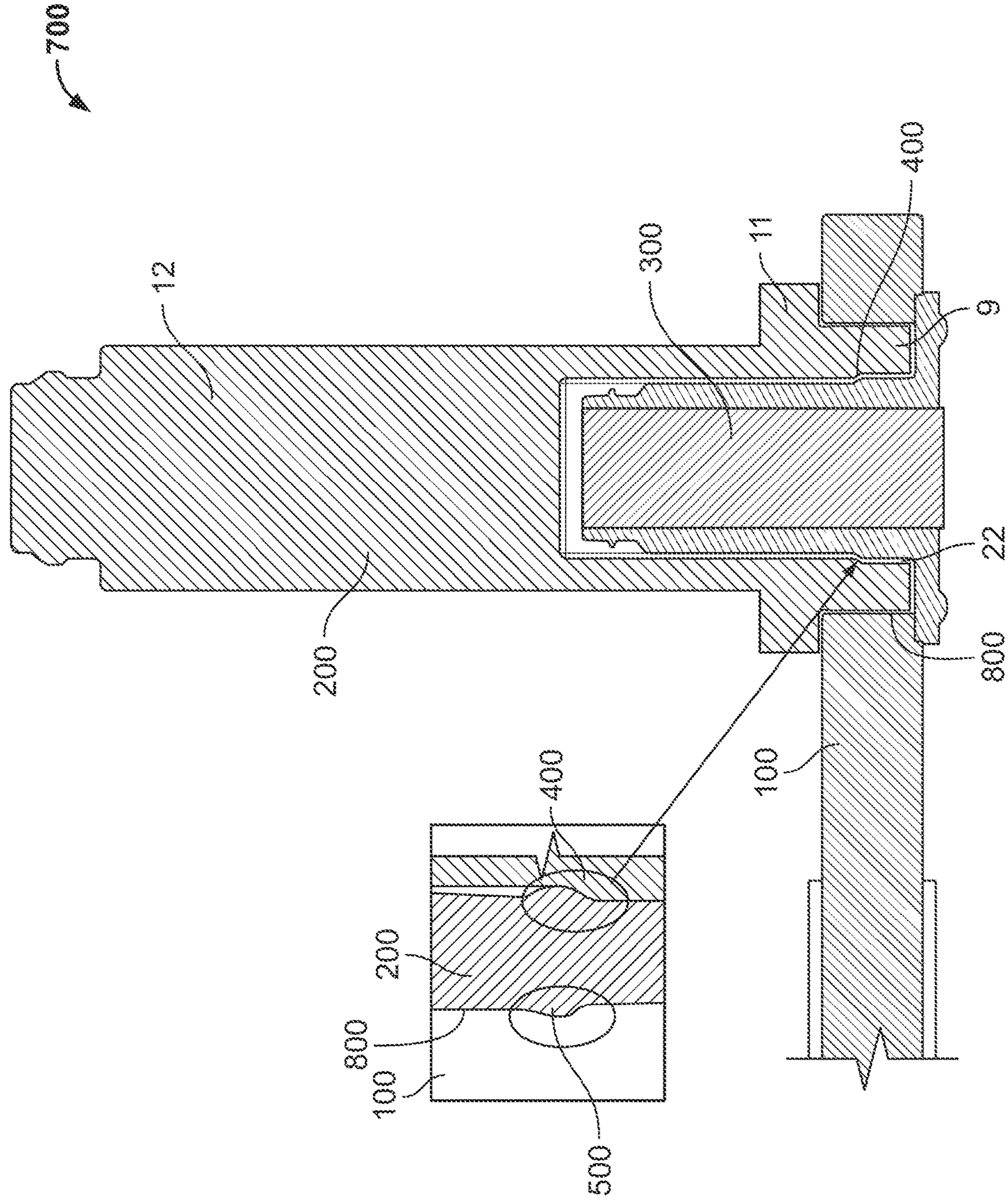
FIG. 4 shows a schematic sectional view of a connection assembly in accordance with embodiments herein.

FIGS. 3 and 4 show embodiments of the connection assembly in accordance with exemplary embodiments. FIG. 3 shows a schematic sectional view of a connection assembly 70 according to an exemplary embodiment. Connection assembly 70 comprises a busbar 10, a contact element 20, and a tool 30 with a projection 40. In FIG. 3, tool 30 is inserted entirely into tubular contact element 20. The enlarged detail from FIG. 3 shows that a recess 50 is formed in inner surface 80 of the hole in busbar 10 and is filled with the material of contact element 20. Recess 50 filled with the material of contact element 20 forms an undercut which creates a permanent and electrically conductive connection between the first and the second metal material.

In the embodiment shown in FIG. 3, a threaded bushing 6 and a screw as a mating member 19 are used to create the undercut. Screw 19 comprises an external thread 16 which can be screwed into the internal thread 15 of threaded bushing 6. For this purpose, screw 19 is inserted into the cavity of tool 30. Screw 19 has a screw head 13 which is wider than the shank of screw 19. This prevents screw 19 from slipping through tool 30. Accordingly, threaded bushing 6 is inserted into a cavity of a contact ring 21. Threaded bushing 6 has a widening 17 at the end that is disposed opposite internal thread 15. This prevents threaded bushing 6 from slipping through contact ring 21.

If screw 19 is screwed into threaded bushing 6, the elements of connection assembly 70, which are arranged between the widening on screw head 13 and widening 17 on threaded bushing 6, are pressed together. In particular, tool 30 is pressed into contact element 20 as a result. Projection 40 on tool 30 thereby presses the material of contact element 20 in the radial direction against inner surface 80 of the hole in busbar 10 so that a recess 50 is created in inner surface 80 of the hole in busbar 10 and is filled with the pressed material of the contact element. Recess 50 filled with the material of contact element 20 therefore forms an undercut which creates a permanent and electrically conductive connection between the first and the second metal material.

FIG. 4 shows a schematic sectional view of a connection assembly 700 according to an exemplary embodiment. Like connection assembly 7 shown in FIG. 1, connection assembly 700 shown in FIG. 4 comprises a busbar 100 made of a first metallic material, for example, aluminum. Busbar 100 comprises a hole in which contact element 200 is arranged. Contact element 200 is made of a second metallic material, for example, copper. Contact element 200 has the shape of a cylinder that is hollow at least in part. The cylinder comprises at a base surface an opening 22 which is connected to the cavity in the cylinder, i.e. the cylinder is tubular on one side.

On the side opposite the tubular side, the cylinder comprises a pin 12 with which an electrically conductive connection, such as a plug connection, can be established to a further contact element (not shown in FIG. 4).

In FIG. 4, a part of contact element 200, namely connecting element 9, is inserted from above into the bore in busbar 100. Contact element 200 has a first exterior diameter that is so much smaller than the interior diameter of the hole in busbar 100 that contact element 200 can be inserted into the hole in busbar 100. Adjacent to connecting element 9, contact element 200 comprises a stop element 11. The latter has a second exterior diameter which exceeds the interior diameter of the hole in busbar 100 to such an extent that stop element 11 cannot be inserted into the hole in busbar 100. Stop element 11 therefore ensures that contact element 200 can only be inserted that distance into the hole in busbar 100 that connecting element 9 is long. When connecting element 9 is inserted entirely into the hole in busbar 100, contact element 200 can no longer be inserted further into the hole in busbar 100, but can only be led out of the hole in busbar 100 in the direction opposite to the direction of insertion.

When producing connection assembly 700, a tool 300 is inserted into the tubular part of contact element 200 in the direction opposite to the direction of insertion of contact element 200. As can be seen in the enlarged detail from FIG. 4, tool 300 comprises a projection 400 on its outer surface. When tool 300 is inserted into the tubular part of contact element 200, projection 400 presses the wall of contact element 200 against inner surface 800 of the hole in busbar 100. The pressure causes the wall of contact element 200 to be deformed in the radial direction towards inner surface 800 of the hole in busbar 100. As a result, a recess 500 is formed in inner surface 800 of the hole in busbar 100. This recess 500 is filled with the material of contact element 200 which is pressed against the inner surface of the hole in busbar 100.

Recess 500 filled with the material of contact element 200 forms an undercut which creates a permanent and electrically conductive connection between the first and the second metal material. With pin 12 at contact element 200, an electrically conductive connection can then be established between busbar 100 and a further contact element (not shown in FIG. 4).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connection assembly comprising:
- a busbar made of a first metallic material, wherein said busbar comprises a hole extending along a hole axis through said busbar;
- a contact element having a first part arranged in said hole in said busbar and a second part outside of said hole, said contact element being rear loaded into said hole in an insertion direction along said hole axis, said contact element made of a second metallic material;
- wherein an outer diameter of said second part of said contact element, which in the direction of insertion is at a rear, is larger than an outer diameter of said first part of said contact element, which in the direction of insertion is at a fore;
- wherein an inner surface of said hole in said busbar includes a recess extending in a radial direction transverse to said hole axis, wherein a portion of said first part projects radially into said recess such that said recess is filled with material of said contact element such that said contact element is held in said hole of said busbar.

2. The connection assembly according to claim 1, wherein the first metallic material comprises aluminum.

3. The connection assembly according to claim 1, wherein the second metallic material comprises copper.

4. The connection assembly according to claim 1, wherein said contact element is tubular.

5. The connection assembly according to claim 1, wherein said contact element comprises a ring pin.

6. The connection assembly according to claim 1, wherein said busbar and said contact element are silver-plated, at least in part.

7. The connection assembly according to claim 1, wherein said contact element includes a projection along said first part filling said recess, said contact element having a larger outer diameter along said projection compared to said outer diameter of said first part.

8. The connection assembly according to claim 1, wherein said busbar at said hole includes an inner diameter, said contact element including a projection along said first part filling said recess, said contact element having a larger outer diameter along said projection compared to said inner diameter of said busbar at said hole.

9. A method for producing a connection assembly, wherein the method comprising:
- producing a busbar having a hole in said busbar extending along a hole axis through said busbar;
- producing a contact element with a first part that can be inserted into said hole in said busbar and a second part that is unable to be inserted into said hole in said busbar, wherein an outer diameter of said second part of said contact element is larger than an outer diameter of said first part of said contact element;
- inserting said first part of said contact element into said busbar in an insertion direction along said hole axis;
- inserting into said contact element a removable tool comprising a projection on its an outer surface of said removable tool, wherein said projection presses a wall of said contact element against an inner surface of said hole in said bus bar so that said wall of said contact element is deformed in a radial direction transverse to said hole axis towards said inner surface of said hole in said bus bar, whereby a recess is formed in said inner surface of said hole in said busbar in said radial direction and wherein a portion of said first part projects radially into said recess such that said recess is filled with material of said contact element which is pressed against said inner surface of said hole in said busbar to hold said contact element in said hole of said busbar.

10. The method according to claim 9, wherein the production of said hole in said busbar is effected by punching.

11. The method according to claim 9, wherein the production of said hole in said busbar is effected by drilling.

12. The method according to claim 9, wherein said hole in said busbar is cylindrical.

13. The method according to claim 12, wherein said cylindrical hole in said busbar is straight.

14. The method according to claim 9, wherein said contact element is tubular.

15. The method according to claim 9, wherein the production of said contact element is effected by cold forming.

* * * * *